United States Patent
Higham et al.

(10) Patent No.: US 10,503,677 B2
(45) Date of Patent: Dec. 10, 2019

(54) DATA COMMUNICATION CABLES WITH POWER

(71) Applicant: HEWLETT-PACKARD DEVELOPMENT COMPANY, L.P., Houston, TX (US)

(72) Inventors: Stephen J Higham, Houston, TX (US); James Smalls, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/760,955

(22) PCT Filed: Nov. 16, 2015

(86) PCT No.: PCT/US2015/060927
§ 371 (c)(1),
(2) Date: Mar. 16, 2018

(87) PCT Pub. No.: WO2017/086920
PCT Pub. Date: May 26, 2017

(65) Prior Publication Data
US 2018/0285299 A1  Oct. 4, 2018

(51) Int. Cl.
*G06F 13/00* (2006.01)
*G06F 13/40* (2006.01)
(Continued)

(52) U.S. Cl.
CPC .......... *G06F 13/4004* (2013.01); *G06F 13/40* (2013.01); *G06F 13/4286* (2013.01);
(Continued)

(58) Field of Classification Search
CPC .... G06F 13/00; G06F 13/1668; G06F 13/385; G06F 13/4022; G06F 13/4059
(Continued)

(56) References Cited

U.S. PATENT DOCUMENTS 5,075,792 A * 12/1991 Brown ............... H04B 10/1143
                                                          341/69
5,514,859 A    5/1996 Seigel
(Continued)

FOREIGN PATENT DOCUMENTS

CN  202267961 U  6/2012
CN  203631893 U  6/2014
(Continued)

OTHER PUBLICATIONS

1 Port Low Profile Native PCI Express Serial Card w/ 16950.
(Continued)

*Primary Examiner* — Titus Wong
(74) *Attorney, Agent, or Firm* — HPI Patent Department

(57) ABSTRACT

Example implementations relate data communication cables. As an example, a data communication cable includes a first electrical connector implementing a first data communication protocol. The first electrical connector includes a set of power pins and a set of data pins. The data communication cable also includes a header connector physically coupled to the set of data pins to route data from a header of a computing device to the set of data pins via the first communication protocol. The data communication cable further includes a second electrical connector implementing a second data communication protocol. The second electrical connector is physically coupled to the set of power pins to provide power from a data communication port of the computing device to the set of power pins via the second data communication protocol.

15 Claims, 3 Drawing Sheets

(51) Int. Cl.
  *G06F 13/42* (2006.01)
  *H01R 12/75* (2011.01)
  *H01R 31/06* (2006.01)
  *H01R 4/24* (2018.01)

(52) U.S. Cl.
  CPC ..... *H01R 12/75* (2013.01); *G06F 2213/0002* (2013.01); *G06F 2213/0042* (2013.01); *H01R 4/24* (2013.01); *H01R 31/06* (2013.01)

(58) Field of Classification Search
  USPC ........................................................ 710/105
  See application file for complete search history.

(56) References Cited

U.S. PATENT DOCUMENTS

| | | | |
|---|---|---|---|
| 6,283,789 | B1 | 9/2001 | Tsai |
| 6,625,144 | B1* | 9/2003 | El-Batal ................ G06F 3/0607 370/364 |
| 6,666,706 | B1 | 12/2003 | Jones |
| 7,043,646 | B2* | 5/2006 | Enami ..................... G06F 1/266 713/300 |
| 7,313,707 | B2 | 12/2007 | Shaver |
| 7,318,551 | B1* | 1/2008 | Mills ......................... G06K 7/10 235/441 |
| 7,794,272 | B1* | 9/2010 | Hiatt ................... H01M 2/1022 439/500 |
| 8,245,058 | B2 | 8/2012 | Lin et al. |
| 8,948,197 | B2 | 2/2015 | Jiang et al. |
| 2005/0001179 | A1 | 1/2005 | Gisler et al. |
| 2006/0090020 | A1* | 4/2006 | Frutkin ................. G06F 13/385 710/62 |
| 2007/0088964 | A1* | 4/2007 | Lee ......................... G06F 1/266 713/300 |
| 2007/0290555 | A1* | 12/2007 | Caren ................... H02J 7/0055 307/31 |
| 2008/0176444 | A1* | 7/2008 | Chan ....................... G06F 1/266 439/505 |
| 2009/0019186 | A1* | 1/2009 | Jiaxiang ................. G06F 1/266 710/8 |
| 2011/0119516 | A1* | 5/2011 | Katayama ............... G06F 1/266 713/340 |
| 2011/0210833 | A1* | 9/2011 | McNeely .............. A61B 5/0006 340/286.07 |
| 2011/0258357 | A1* | 10/2011 | Lin ....................... G06F 13/409 710/305 |
| 2012/0011376 | A1* | 1/2012 | Zai .......................... G06F 1/263 713/300 |
| 2012/0178287 | A1* | 7/2012 | Mantay .................. H01R 31/02 439/505 |
| 2013/0254431 | A1* | 9/2013 | Kuroiwa ................... G06F 3/00 710/14 |
| 2014/0178015 | A1* | 6/2014 | Tong ..................... G02B 6/4284 385/88 |
| 2015/0212497 | A1* | 7/2015 | Dunstan .................... G06F 1/26 307/130 |
| 2016/0006584 | A1* | 1/2016 | Agrawal .................. H04L 5/20 375/299 |

FOREIGN PATENT DOCUMENTS

| | | |
|---|---|---|
| CN | 203674519 U | 6/2014 |
| CN | 204538421 U | 8/2015 |

OTHER PUBLICATIONS

Amazon generic USB to 9-pin Serial Port Adapter.
Crystalfontz DB9 RS232 and power cable.
USB to TTL Serial Cable—Debug / Console Cable for microcontroller/ Raspberry Pi/WiFi router serial console port.
Webpage—"Why Add a Serial Port?"—http://www.nslu2-linux.org/ wiki—retrieved Nov. 12, 2015—8 pages.

* cited by examiner

DATA COMMUNICATION CABLES WITH POWER

BACKGROUND

There is a plurality of data communication protocols that enable two electronic devices to communicate with each other. For example, a serial communication protocol may enable two connected devices to communicate data one bit at a time.

BRIEF DESCRIPTION OF THE DRAWINGS

Some examples of the present application are described with respect to the following figures.

DETAILED DESCRIPTION

Examples of serial communication protocols include a Recommend Standard (RS)-232 protocol, a RS-422 protocol, and a RS-485 protocol. In particular, the RS-232 protocol is widely deployed to enable communication between a host computing device and a peripheral device, such as a modem. Some peripheral devices, such as a powered serial bar code scanner, receive power from a serial port on the host computing device that implements a serial communication protocol. However, serial communication protocols do not define a mechanism to deliver power. Thus, computing devices with serial ports do not have an easy and cost effective way to provide power via the serial ports.

Examples described herein provide a data communication cable to provide power through a serial port. For example, a data communication cable may include a serial connector. The serial connector may include a power pin and a set of data pins. The data communication cable may also include a header connector physically coupled to the set of data pins to route data from a header of a computing device to the set of data pins via a serial communication protocol. The data communication cable may further include a Universal Serial Bus (USB) connector physically coupled to the power pin to provide power from a USB port of the computing device to the power pin. Thus, the cost and difficulty of enabling a host computing device to provide power via a serial port may be reduced.

Figure 1:
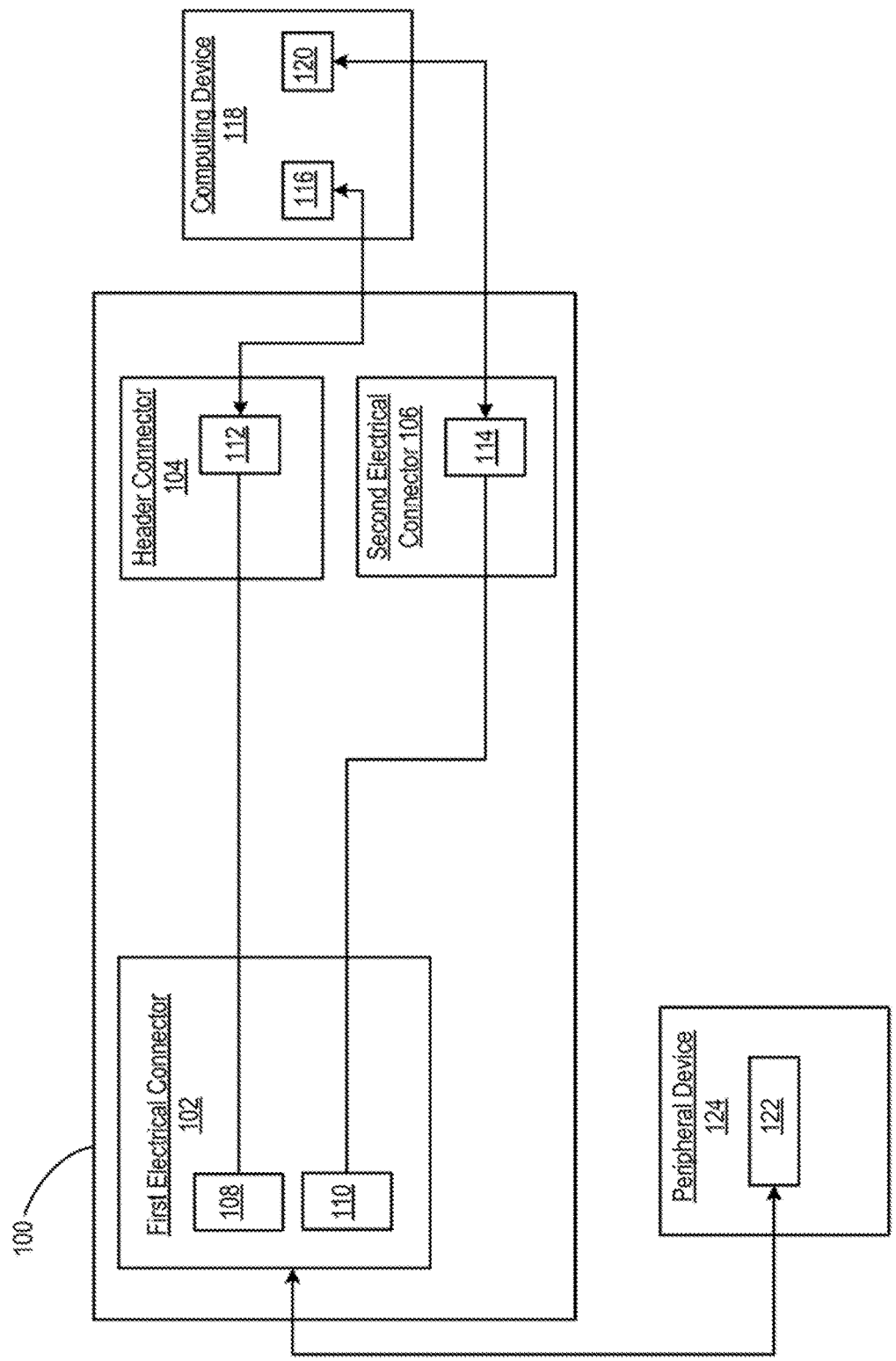
FIG. 1 illustrates a data communication cable with a header connector to receive data and an electrical connector to receive power, according to an example.

FIG. 1 illustrates a data communication cable 100 with a header connector to receive data and an electrical connector to receive power, according to an example. Data communication cable 100 may include a first electrical connector 102, a header connector 104, and a second electrical connector 106. Connectors 102-106 may be mechanical devices used to join electrical circuits. Data communication cable 100 may enable two electronic devices (e.g., a peripheral device and a host computing device) to communicate.

First electrical connector 102 may include a plurality of contact pins. The plurality of contact pins may include a set of data pins 108 and a set of power pins 110. Set of data pins 108 may route data from header connector 104 to a peripheral device connected to first electrical connector 102 via first electrical connector 102. Set of power pins 110 may route power from second electrical connector 106 to the peripheral device. Set of data pins 108 may be physically coupled to header connector 104 via metal wire(s). Set of power pins 110 may be physically coupled to second electrical connector 106 via metal wire(s).

Header connector 104 may include a set of contact pins 112 and second electrical connector 106 may include a set of contact pins 114. First electrical connector 102 and header connector 104 may implement a first data communication protocol. The first data communication protocol may be a serial communication protocol. The serial communication protocol may include the RS-232 protocol, the RS-422 protocol, and the RS-485 protocol.

The number of contact pins in set of data pins 108 and set of contact pins 112 may depend on the particular data communication protocol implemented. In some examples, set of data pins 108 and set of contact pins 112 may each include at least three contact pins. In some examples, set of data pins 108 and set of contact pins 112 may each include a single pin.

Second electrical connector 106 may implement a second data communication protocol that is different from the first data communication protocol. The second data communication protocol may enable power delivery and data communication. For example, second electrical connector 106 may implement a Universal Serial Bus (USB) protocol. The USB protocol may include a USB 1.x protocol, a USB 2.x protocol, and a USB 3.x protocol.

Second electrical connector 106 may include a set of contact pins 114. The number of contact pins in set of contact pins 114 may depend on the data communication protocol implemented. A subset of set of contact pins 114 may be physically coupled to set of power pins 110 to provide power from second electrical connector to first electrical connector 102. Thus, contact pins in set of contact pins 114 used for data communication may not be coupled to first electrical connector 102 and may be terminated.

During operation, header connector 104 may be plugged into a header 116 of a computing device 118 via set of contact pins 112. Second electrical connector 106 may be plugged into a data communication port 120 of computing device 118 via set of contact pins 114. First electrical connector 102 may be plugged into a data communication port 122 of a peripheral device 124 via set of data pins 108 and set of power pins 110. Thus, peripheral device 124 may communicate with computing device 118.

Computing device 118 and peripheral device 124 may exchange data communication via the first data communication protocol, such as the RS-232 protocol. Thus, data may be exchanged one bit at a time as defined by the RS-232 protocol. Data may be routed between computing device 118 and peripheral device 124 via set of data pins 108 and header connector 104. Computing device 118 may deliver power from data communication port 120 to second electrical connector 106 via the second data communication protocol, such as the USB protocol. Thus, 5 volts electrical power may be delivered from computing device 118 to peripheral device 124 as defined by the USB protocol. The power may be routed from second electrical connector 106 to set of power pins 110. Peripheral device 124 may receive the power via set of power pins 110.

Figure 2:
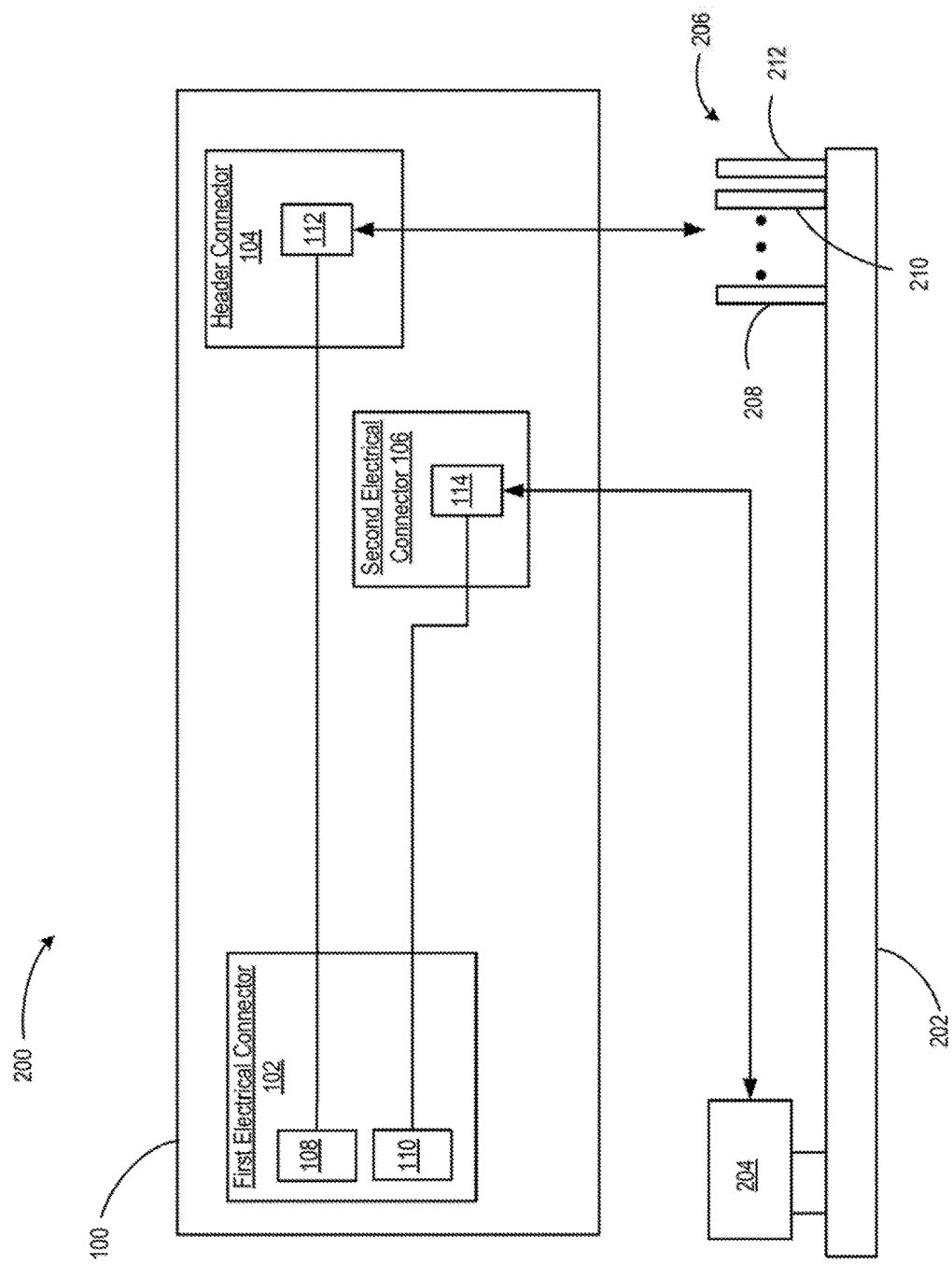
FIG. 2 illustrates a data communication system with a data communication cable to provide data communication via a header connector of the data communication cable and to provide power via an electrical connector of the data communication cable, according to an example.

FIG. 2 illustrates a data communication system 200 with a data communication cable to provide data communication via a header connector of the data communication cable and to provide power via an electrical connector of the data communication cable, according to an example. Data communication system 200 may include data communication cable 100 and a system board 202.

System board 202 may be a printed circuit board that hosts electrical components of an electronic device. For example, system board 202 may host components of a computing device, such as a processor, a memory, a peripheral component interconnect (PCI) express slot, etc. In some examples, system board 202 may host components of computing device 118 of FIG. 1. System board 202 may include a USB port 204 and a header 206. USB port 204 and header 206 may extend from system board 202. Header 206 may include a plurality of contact pins 208, 210, and 212 to implement the serial communication protocol.

During operation, header connector 104 may be plugged into header 206. In some examples, header connector 104 may be implemented as an Insulation-Displacement Contact (IDC) connector. Header connector 104 may also implement the serial communication protocol. Thus, header connector 104 may include a plurality of jacks (not shown) to receive the plurality of contact pins 208-212.

Second electrical connector 106 may be plugged into USB port 204 and may implement the USB protocol. Second electrical connector 106 and USB port 204 may be implemented using the same type of USB connector. The type of USB connector may include USB Type-A connector, USB Type-B connector, USB Type-C connector, USB micro connector, and USB mini connector. USB port 204 may be implemented using a USB receptacle and second electrical connector 106 may be implemented using a USB plug. First electrical connector 102 may be implemented as a serial connector to implement the serial communication protocol. For example, the serial connector may include a D-subminiature 9 pin connector and a D-subminiature 25-pin connector.

USB port 204 may provide power to second electrical connector 106 via the USB protocol. Second electrical connector 106 may route the power to set of power pins 110 of first electrical connector 102. Data may be routed between set of data pins 108 of first electrical connector 102 and header 206 via the serial communication protocol. Thus, data communication cable 100 may enable a computing device implementing using system board 202 to provide a powered serial port as implemented using first electrical connector 102.

Figure 3:
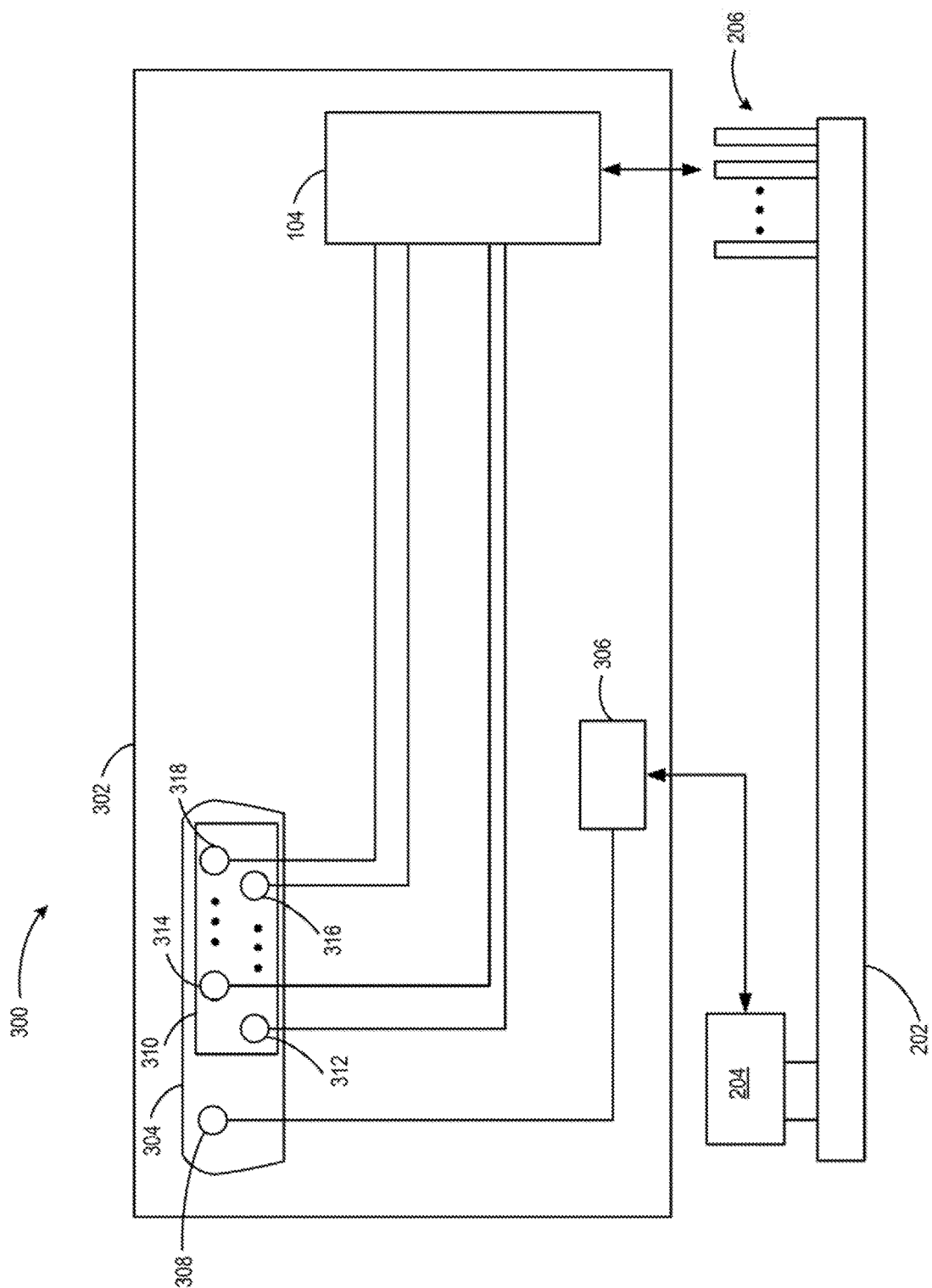
FIG. 3 illustrates a data communication system with a data communication cable to provide data communication via a header connector of the data communication cable and to provide power via an electrical connector of the data communication cable, according to another example.

FIG. 3 illustrates a data communication system 300 with a data communication cable to provide data communication via a header connector of the data communication cable and to provide power via an electrical connector of the data communication cable, according to another example. Data communication system 300 may include a data communication cable 302 and system board 202. Data communication cable 302 may implement data communication cable 100 of FIGS. 1-2.

Data communication cable 302 may include a serial connector 304 implemented as a male D-subminiature 9 pin connector, header connector 104, and a USB connector 306 implemented as a USB standard-A plug. Serial connector 304 may include a power pin 308 and a set of data pins 310. Set of data pins 310 may include a plurality of contact pins, such as contact pins 312, 314, 316, and 318. Each of contact pins 312-318 may be coupled to a corresponding contact pin in header 206 via header connector 104 to route data between set of data pins 310 and header 206.

USB connector 306 may be plugged into USB port 204 that may be implemented as a USB standard-A receptacle. Power may be transmitted from USB port 204 to power pin 308 via USB connector 306. USB port 204 and USB connector 306 may each include a plurality of contact pins. However, USB connector 306 may be physically coupled to serial connector 304 via a single pin (e.g., power pin 308). Thus, in some examples, a single contact pin in USB connector 306 is physically coupled to power pin 308 to deliver power from USB port 204.

The use of "comprising", "including" or "having" are synonymous and variations thereof herein are meant to be inclusive or open-ended and do not exclude additional unrecited elements or method steps.

What is claimed is:

1. A data communication cable comprising:
  a first electrical connector implementing a first data communication protocol, the first electrical connector including a set of power pins and a first set of data pins, wherein the first electrical connector is to provide the first data communication protocol through the first set of data pins and provide electrical power through the set of power pins to a peripheral device coupled to the first electrical connector;
  a header connector physically coupled directly to the first set of data pins to route data from a header of a computing device to the first set of data pins via the first communication protocol; and
  a second electrical connector implementing a second data communication protocol through a second set of data pins, the second electrical connector physically coupled directly to the set of power pins to provide power from a data communication port of the computing device to the set of power pins, wherein the second set of data pins of the second electrical connector are terminated such that the second set of data pins are not coupled to the set of power pins or coupled to the first set of data pins of the first electrical connector to prevent data communication through the second electrical connector to the first electrical connector.

2. The data communication cable of claim 1, wherein the first data communication protocol is a Recommend Standard (RS)-232 protocol.

3. The data communication cable of claim 1, wherein the second data communication protocol is a Universal Serial Bus (USB) protocol.

4. The data communication cable of claim 1, wherein an electrical connector of the computing device is physically coupled to a single pin of the first electrical connector.

5. The data communication cable of claim 1, wherein the power is 5 volts electrical power.

6. A data communication cable comprising:
  a serial connector, wherein the serial connector includes a power pin and a first set of data pins, wherein the serial connector is to provide a first data communication protocol through the first set of data pins and provide electrical power through the power pin to a peripheral device coupled to the serial connector;
  a header connector physically coupled directly to the first set of data pins to route data from a header of a computing device to the first set of data pins via a serial communication protocol; and
  a Universal Serial Bus (USB) connector physically coupled directly to the power pin to provide power from a USB port of the computing device to the power pin, wherein a second set of data pins corresponding to the USB connector are terminated such that the second set of data pins are not coupled to the power pin or coupled to the first set of data pins of the serial connector to prevent data communication through the USB connector to the serial connector.

7. The data communication cable of claim 6, wherein the serial connector is a D-subminiature 9-pin connector or a D-subminiature 25-pin connector, and wherein the header connector is an Insulation-Displacement Contact (IDC) connector.

8. The data communication cable of claim 6, wherein the USB connector is coupled to a single pin of the serial connector.

9. The data communication cable of claim 6, wherein the power is 5 volts electrical power.

10. The data communication cable of claim 6, wherein the serial communication protocol is a Recommend Standard (RS)-232 protocol.

11. A data communication system comprising:
 a system board including:
  a header implementing a serial communication protocol, wherein the header includes a set of contact pins extending from the system board;
  a Universal Serial Bus (USB) port extending from the system board; and
 a data communication cable coupled to the header and the USB port, wherein the data communication cable includes:
  a serial connector;
  a header connector physically coupled directly to the serial connector to route data from the header of the system board to the serial connector via the serial communication protocol; and
  a USB connector, wherein the USB connector is physically coupled directly to the serial connector to provide power from the USB port of the system board to the serial connector, wherein a set of data pins corresponding to the USB connector are terminated such that the set of data pins corresponding to the USB connector are not coupled to the serial connector to prevent data communication through the USB connector to the serial connector.

12. The data communication system of claim 11, wherein the serial connector is a D-subminiature 9-pin connector or a D-subminiature 25-pin connector, and wherein the header connector is an Insulation-Displacement Contact (IDC) connector.

13. The data communication system of claim 11, wherein the power is 5 volts electrical power.

14. The data communication system of claim 11, wherein the serial communication protocol is a Recommend Standard (RS)-232 protocol.

15. The data communication system of claim 11, wherein the USB connector is coupled to a single pin of the serial connector.

\* \* \* \* \*